Feb. 20, 1973    G. A. WAY    3,717,120
APPARATUS PARTICULARLY ADAPTED FOR MARKING PRODUCTS
Filed Sept. 19, 1969    5 Sheets-Sheet 1

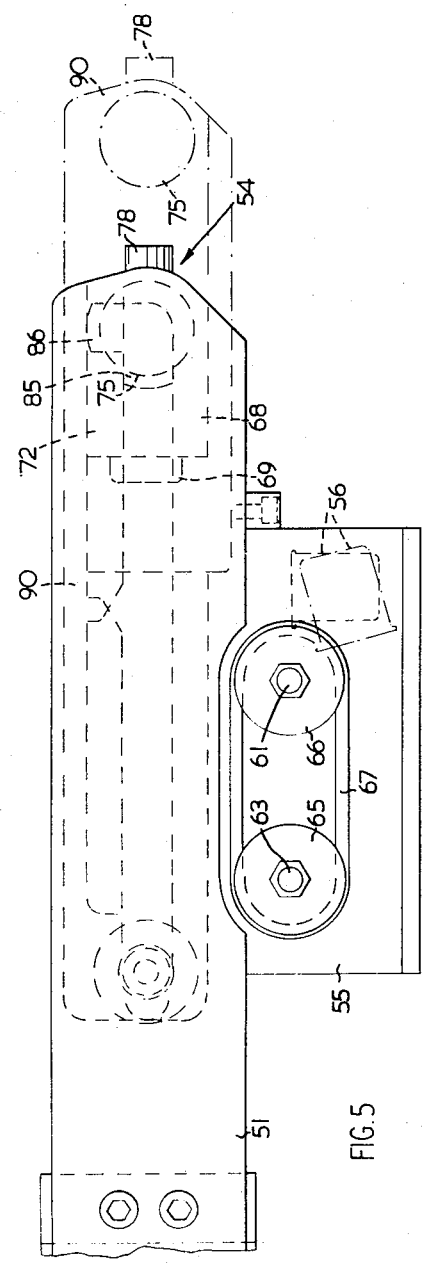
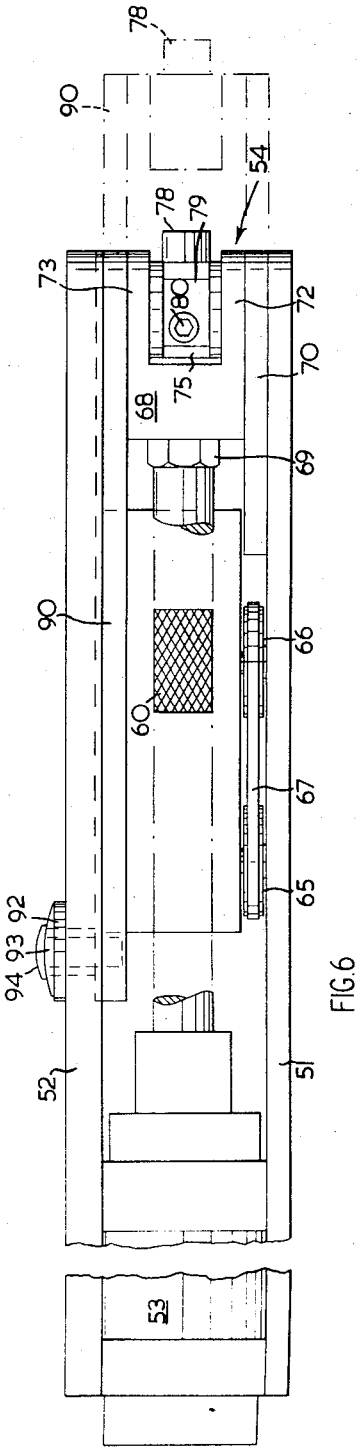
FIG. 5
FIG. 6

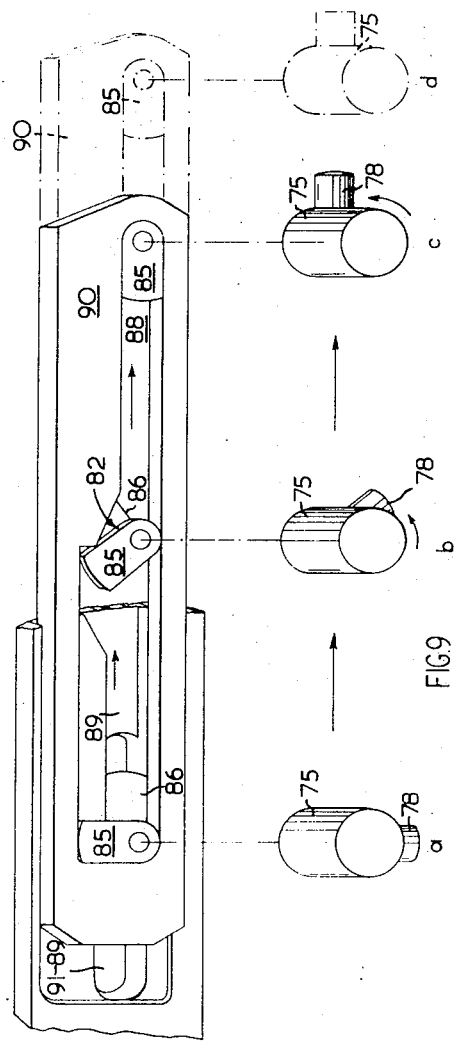

United States Patent Office 3,717,120
Patented Feb. 20, 1973

3,717,120
APPARATUS PARTICULARLY ADAPTED FOR MARKING PRODUCTS
Gordon Alexander Way, Windsor, Ontario, Canada, assignor to Dynamic Manufacturing Limited, Windsor, Ontario, Canada
Filed Sept. 19, 1969, Ser. No. 859,537
Claims priority, application Canada, Sept. 20, 1968, 30,488
Int. Cl. B05c 1/02
U.S. Cl. 118—263
6 Claims

ABSTRACT OF THE DISCLOSURE

A marking unit particularly for use in a system of production line quality control, characterized by an inspection station including a sensing device for gauging a property of each workpiece passing along the production line, the sensing device being linked to the marking unit which is arranged to apply marks to the individual workpieces dependent on their acceptability. The marking unit includes an extendible marking head attached to a plunger reciprocal along a straight path, the marking head carrying a stamp rotatable from the marking position (transverse to the direction of plunger movement), to a wetting position in which it wipes across a roller on its movement towards the workpiece.

---

The present invention relates to apparatus suitable for use in quality control of articles produced on an automated production line.

In recent years there has been large scale introduction of automated production lines for performing many machining and assembly operations on each workpiece passing along the line. For example, in the automobile industry, production lines have been installed for engines, which accept at one end rough castings and components, machine the castings and components as necessary, and assemble the parts to produce a virtually complete engine.

Problems of quality control have arisen in such installations. One common method of quality control has been to sample say every tenth unit, and to check all the necessary dimensions and properties on this sample. Such methods operate on a statistical basis, on the assumption that the machining and assembly devices change their characteristics only slowly, and not suddenly between operations. However, there is always an element of chance in such a method in allowing say ninety percent of the production to pass through without checks.

Automatic gauging devices are known for checking the dimensions of components, and which are suitable for use in checking every unit that passes on a production line. Such devices are much used in production lines producing large numbers of small components. In such production lines, there are arrangements linked to the gauging means which automatically reject components not within tolerances, these components then going to scrap.

However, in the case of larger products such as engines produced on an automated line it would generally not be economical to scrap every unit which was outside the required tolerances, since generally rectification is possible. Also, it would be impractical in such production lines to provide enough space for rejected units to leave the production line at different points. Accordingly, when it is desired to check every unit, it has generally been necessary to have an operator watching the gauging devices of a particular station, and making marks manually on the workpieces, in accordance with the reading on the gauges. Such marks can then be interpreted at the end of the production line to determine whether a unit is acceptable, or if rectification or scrapping is required. Clearly such methods use considerable manpower, and it is an object of the present invention to provide means eleminating the use of such manpower, and which also provides further advantages which will become apparent from the detailed description.

The present invention relates to a marking unit particularly suitable for use in a production line and which is interconnected with a sensing device for gauging a property of each workpiece passing along the production line, such property being relevant to the acceptability of the workpiece for a particular purpose. The sensing device produces a signal dependent on the acceptablity of the workpiece which signal operates the marking unit to apply a mark to the workpiece sensed by the sensing unit.

Generally, the sensing means is a gauge sensing a dimension of the workpiece, and the signal produced by the gauge is an electrical signal. Such an arrangement can make use of well known commercially available electro-air gauges which provide electrical signals. The sensing device may, however, be a fluid pressure sensing device (pressure switch) combined with fluid actuated means for performing an operation on a workpiece, the movement of the fluid actuated means being restrained on completion of the operation to cause a rise in pressure of the fluid supplied to the said means, the rise in fluid pressure providing the signal causing operation of the marking unit. Alternatively, the sensing device may sense the pressure of fluid held in an enclosure formed by the workpiece as in a leak test, the signal for operating the marking unit being dependent on the pressure of fluid maintained in the enclosure after a given time interval.

The marking unit in accordance with this invention comprises an extendible head attached to a plunger reciprocal along a straight path, the head carrying a stamp rotatable from a first rotational position, in which position the stamp face is transverse to the direction of the plunger movement and in such position as to contact a workpiece when the plunger is extended to a second rotational position in which the stamp face is substantially parallel to the direction of plunger movement, means for applying fluid to the stamp face comprising a fluid carrying surface so disposed beside the path of the head movement as to be wiped by the stamp face when in its second rotational position, and means for rotating said stamp in such manner as to ensure that the stamp face is in the first position when the plunger is fully extended, and is in the second position when the head passes the fluid carrying surface.

Preferably, the plunger is attached to the piston of a fluid powered cylinder.

Where the test station including the marking unit is part of a production line, having means for performing operations subsequent to the workpiece passing through the inspection station, the marking unit is arranged to apply a mark on the workpiece in such manner as to avoid obliteration by the subsequent operations, at least until the marks have been inspected or noted. The further operations may be performed in stations having marking units applying marks to the workpiece which contrast with marks applied in the preceding stations and which are differently located. The marks applied in the different stations may be colour coded.

The marking unit apparatus in accordance with the invention also has novel means for rotating the stamp, and for applying a marking fluid to the stamp.

A particular feature of the marking unit is that it is capable of extending into the production line to mark a recessed portion of a workpiece and can retract into its normal position so as to be clear of the path of movement of the workpiece.

The invention will now more particularly be described by way of examples by reference to the accompanying drawings, in which:

FIG. 5 is a side elevation of a marking unit such as is used in the inspection stations of FIGS. 1 to 4;

FIG. 6 is a plan view of the marking unit;

FIG. 9 is a diagrammatically exploded view of some components of the marking unit in successive positions.

FIGS. 1 to 4 show various stations of a production line for producing automobile engines of the V-8 type from rough cast components, the movement of the production line being from left to right as shown.

FIG. 1 shows at the left-hand side an initial machining station in which the cylinder blocks 10, which are fed into the station on a conveyor in their inverted position, have one of their crankshift journals machined by milling wheels 12. The milling wheels move horizontally across the cylinder block, and are withdrawn to the side when the next block is moved along.

Movement of the cylinder block along the conveyor between successive operations may be accomplished by known means such as transfer rails movable below fixed slide rails on which the blocks can be moved, the transfer rails being reciprocal longitudinally of the slide rails and having hinged dogs which engage with successive cylinder blocks and move these along the slide rails when the transfer rails are moved in the forward direction.

Figure 1:
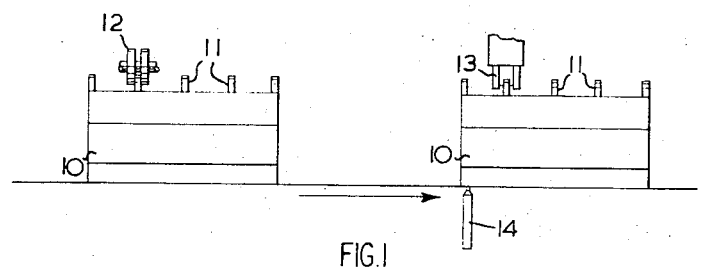
FIGS. 1 to 4 show diagrammatically various operating stations and inspection stations of an automated production line used in the production of automobile engines, each inspection station having a marking unit or units.

At the right-hand side of FIG. 1 there is indicated an inspection station, provided with sensing means in the form of an automatic electro-air gauge 13 which checks the dimension between tthe opposite thrust faces of the one journal indicated. The dimension of only one of the journals is critical, since only one is used to locate the crankshaft axially in the engine, the other being clearance fits on the crankshaft.

The electro-air gauge, which is of known type, includes two support arms, one having a lug which locates on one of the machined surfaces, and the other holding a sensing head in close proximity to the other surface, there being a constant spacing between the lug and the sensing head. The sensing head is provided with an air passage opening in the proximity of the machined journal surface, and this air passage is supplied with air from a constant pressure source via a two-limit transducer, which is a device giving an electrical signal when subjected to a pressure which is between two predetermined limits. When the space between the sensing head and the adjacent machined surface is within certain limits, indicating that the journal is within proper tolerances, the proximity of a machined surface to the sensing head restricts the flow of air from the air passage so as to cause a back pressure at the transducer, this pressure being such as to operate the transducer. The transducer thus produces a signal which causes actuation of a marking unit indicated at 14, when the dimensions of the journal are correct.

The marking unit, which will be described in more detail with reference to FIGS. 5 to 9, includes an extendible marking head having a stamp for applying a mark to the machined workpiece, and means causing extension of the marking head on receipt of an electrical signal from the gauge 13. The marking unit 14 is so disposed in relation to the gauge 13 that on receipt of the electrical signal the marking head is extended and the stamp thereof contacts the lower surface of the cylinder block as positioned on the conveyor, and applies to that surface a mark indicating that the journal faces have been correctly machined.

As will be apparent from the detailed description below, the marking unit preferably marks by means by paint applied to its stamp when the stamp is in the retracted position. Also, the movement of the extendible marking head is preferably controlled by a fluid actuated piston in cylinder arrangement, the fluid supplied thereto being controlled by a four-way solenoid valve operated by the electrical signal given by the transducer of the electro-air gauge. Such four-way solenoid valves have connections to both ends of the pneumatic cylinder of the marking unit, and in one position of the valve, air is supplied to the rear end of the cylinder and exhausted from the front end, and in the second position, these connections are reversed. Such four-way solenoid valves are a well known commercial item, and may form an attachment to the pneumatic cylinder of the marking unit.

Figure 2:
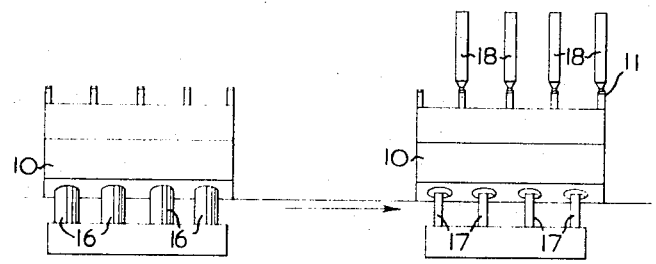

FIG. 2 shows a machining station and an inspection station for dimensioning the cylinder bores. At the left-hand side of FIG. 2 is shown the machining station which automatically and simultaneously machines the four cylinders on each side of the cylinder block with the boring tools 16. At the right-hand side of FIG. 2 there is shown an inspection station including four electro-air gauges 17 for each side of the block, these being also of known form generally similar to the gauges 13 described but arranged so as to operate internally of the bores. Each gauge 17 is electrically linked to a marking unit 18, and the marking units are arranged in pairs and vertically mounted to mark on the tops of the journals 11. Each gauge 17 operates individually, and if the dimensions of a bore sensed by a gauge are within the required tolerances, this gauge provides a signal operating the respective marking unit which makes a mark having a position corresponding to that of the bore. The marking units are arranged to mark the journals 11 merely for convenience, and it is clearly unimportant which four journals are marked providing that each can be identified with a particular bore. It is no consequence that the marks are later covered by the crankcase, since the block is inspected for the presence of the marks before the crankcase is fitted.

Figure 3:
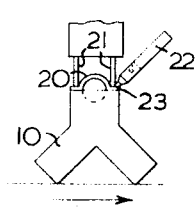

FIG. 3 shows a station which runs nuts onto bolts extending upwardly from the base of the inverted cylinder block to secure the crankcase 20 thereto, these components having been positioned by automatic means interposed between the stations shown in FIGS. 2 and 3. The nut runners 21 are of generally standard form, but include a mechanical torque override arm which moves to operate a limit switch when the desired torque has been applied to the nuts. The torque arm in this case constitutes the sensing means gauging the sufficiency of the torque applied to the nuts, and the limit switches operated by these torque arms are interconnected to provide an electrical signal when all the limit switches have been operated. This signal is transmitted to a marking unit 22, which is disposed to make a mark on a flat portion 23 of the inverted cylinder block on receipt of the signal. The marking unit is similar to those shown in FIGS. 1 and 2, and it will be noted that this is an extendable unit so that, after marking the portion 23 of the cylinder block, this can retract so that all parts thereof are above the top level of the crankcase 20, so that the marking device does not interfere with movement of the next workpiece.

Figure 4:
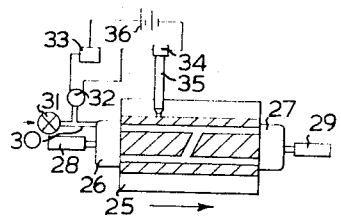
Figure 7:
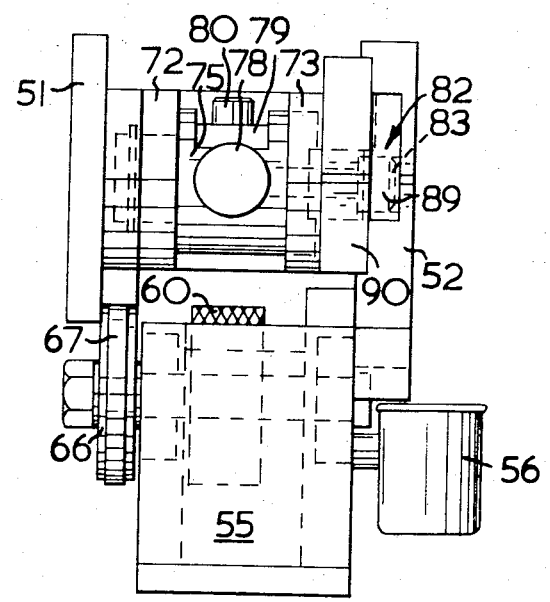
FIG. 7 is an end elevation of the marking unit.

FIG. 4 shows an inspection station which tests the leak tightness of ducts in the cylinder block. FIG. 4 indicates the water ducts 25 in the sectional plan view shown, and the open ends of these ducts are enclosed by sealing caps 26 and 27 which are clamped onto the ends of the ducts 25 by pneumatic cylinders 28 and 29. The caps 26 and 27 are provided with soft gaskets sealing around the ends of the ducts 25, and the cap 26 is provided with an inlet air conduit 30 leading from a compressed air supply via a shut-off valve 31. This conduit 30 has a side branch leading to a pressure switch 32 the contacts of which can be maintained closed by a certain minimum pressure in the conduit 30. The pressure switch 32 is in circuit with a timer switch 33, the four-way solenoid valve 34 of a marker unit 35, and a source of voltage 36.

When the sealing caps 26 and 27 are pressed by the cylinders 28 and 29 against the ends of the crankcase, all the apertures leading to the enclosure formed by ducts 25 are closed off except for the conduit 30. Compressed air is fed into the enclosure at a predetermined pressure through the conduit 30 and valve 31, and when the pressure in the enclosure has reached the predetermined value the valve 31 is shut off. The timer switch 33 then begins to operate, and after a given period of time this switch closes to allow an electrical current to flow therethrough. If the pressure within the enclosure has been satisfactorily maintained during this period, the contacts of the pressure switch 32 will have remained closed, and in this case the circuit is completed to operate the solenoid valve 34, and accordingly to operate the marker 35 to mark the cylinder block. Thus the cylinder block is marked on the satisfactory conclusion of the test. If however the enclosure leaks to such an extent that it fails to maintain a sufficient pressure of air during the period of time set by the timer switch 33, the contacts of the pressure switch 32 will open before the timer switch contacts close so that no current flows to the circuit at any time and the marker is not operated.

Another form of operation for which the present invention is suitable is that in which an operation is performed by fluid actuated means, and in which the pressure reached by the fluid within these means determines whether the operation has been satisfactorily formed. For example, fluid actuated nut runners might be used in an embodiment similar to that shown in FIG. 3, but in which the torque applied by the runners is indicated by the pressure of fluid supplied thereto. In this case, the rise in fluid pressure may itself provide the signal which operates the marking unit, and such a signal may either be an electrical signal produced by a pressure switch in the fluid circuit or may be a signal communicated by the pressure fluid itself.

Clearly, it is essential when this method of quality control is applied to a production line, that the markings should be such that they are not covered over or obliterated before they are insepcted as necessary.

The method of quality control provided by this invention is also useful when, instead of using completely interchangeable components to assemble units such as engines, components produced by different machines are selected according to their dimensions and are matched with mating components also of the same dimensions and selected in a similar manner. For example, pistons produced on one production line may be matched, according to their dimensions, with the cylinders of cylinder blocks produced on another line. Thus the inspection station according to the present invention may indicate not only the general acceptability or otherwise of the component, but also indicate, for example by colour coding, the acceptability of the component for fitting together with another component of a particular size.

The marking unit itself will now be described with reference to FIGS. 5 to 9. This unit comprises two similar sideplates 51 and 52, attached to opposite sides of the end mounting blocks of a pneumatic cylinder 53. The sideplates 51 and 52 extend forwardly of the front end of the pneumatic cylinder, and enclose a slideway for a marker head indicated at 54 which is movable by the piston rod of the pneumatic cylinder 53.

A paint reservoir 55 is mounted beneath the forward extension of the plates 51 and 52, so as to underlie the path of movement of the marker head 54, this paint reservoir being fixed to one sideplate 52. The paint reservoir 55 is totally enclosed except for an inlet filler cup 56, and an aperture 57 in its top cover (see FIG. 8). A paint roller 60 is fixed to a horizontal spindle 61 which passes through leakproof bearings in the sides of the reservoir, and the roller is arranged so that a portion thereof protrudes through the aperture 57 in the top of the reservoir, the roller almost filling the space presented by this aperture. As will be seen from FIG. 8 of the drawings, only a very minor proportion of the roller projects outwards from the aperture. A further spindle 63, parallel to spindle 61, is carried by similar bearings in the reservoir sidewalls and is disposed at the same level as spindle 61 and rearwardly thereof with respect to the outwards movement of the marker head, which movement is towards the right-hand side of FIG. 1. The two spindles 61 and 63 both have one end thereof extending from the near side of the reservoir (as viewed in FIG. 1) and these spindle ends carry aligned pulley wheels 65 and 66 respectively. These two pulley wheels are connected by a belt 67, for example of rubber, which is engageable by means to be described to cause rotation of the pulleys and thereby to rotate the roller. The interior of the paint reservoir contains a sponge which soaks up the paint supplied to the filler cup 56, and which minimizes leakage of paint from the reservoir. This is because when the marker is to be used with a reservoir in other than the normal horizontal position, the sponge capillary action is used to insure wetting of the roller even when only a small quantity of paint is used in the reservoir to avoid leakage.

At its forward end, the piston rod of pneumatic cylinder 53 is screwed into a bifurcated member 68 and secured by a lock nut 69. To the side of the member 68 is attached a drive plate 70, the lower edge of which has a roughened surface engaging the top surface of the belt 67 to turn the pulley wheels 65 and 66 as the plate 70 advances with the member 68.

The bifurcated member 68 has two parallel side flanges 72 and 73 having aligned holes. The hole in flange 73 is large enough for a stamp holder 75, of generally cylindrical form, to be inserted therein. The holder 75 has a coaxial extension 76 of smaller diameter which fits through the hole of flange 72, and is provided at its outer end with a groove for holding a snap ring engaging the outer surface of the flange 72, to rotatably hold the marker holder 75 in the member 68. The plate 70 is apertured to clear the protruding extension 76 of the marker holder and its snap ring.

The stamp holder 75 has a blind radial bore sized to receive a stamp 78, which is a cylindrical component of yieldable material such as urethane having a slightly rounded outer face. The top curved surface of the holder 75 is flattened to form a groove which communicates at its forward end with the bore holding the stamp 78. The rearward end of the groove is provided with a tapped hole by means of which a small clamp plate 79 is secured by screw 80, the lower surface of this plate 79 pressing down on the top of the stamp 78 to hold this in position.

The end of the stamp holder 75 which lies within the flange 73 is diametrically slotted, and this slot is engaged by an indexing member 82 having a parallel sided projection at one end which is retained in the said slot by a screw 83. The indexing member 82 includes two mutually perpendicular and laterally spaced dogs 85 and 86, one of said dogs (85) extending rearwardly of the stamp and transversely of the stamp face, and the other dog 86 extending parallel to the stamp face.

Figure 8:
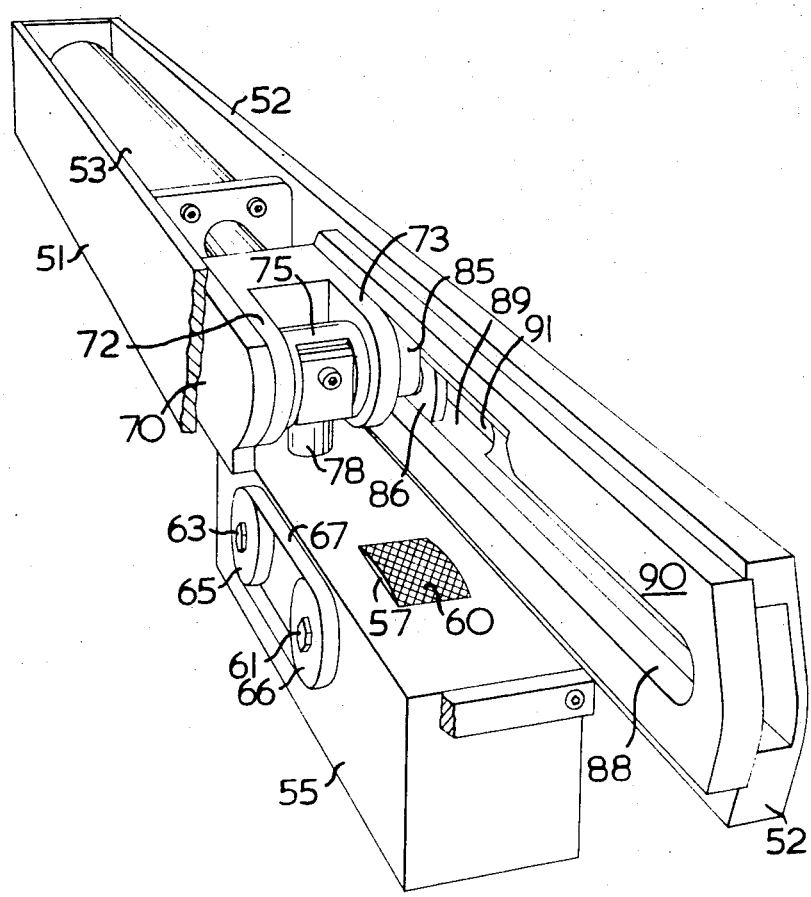
FIG. 8 is a perspective view of the marking unit, partly broken away.

The two dogs 85 and 86 of the indexing member engage respectively in first and second laterally spaced guideways 88 and 89, which are most clearly seen in FIGS. 8 and 9. Each of the guideways is of such width as to allow free movement of the respective dog, i.e. the dog which is laterally aligned with the guideway, when this dog is axially aligned with the longitudinal axis of the guideway, and the guideway prevents rotation of the dog from the aligned position. FIG. 9 illustrates four successive positions of the indexing member 82 by the reference letters a, b, c, and d, and as shown in this drawing the dogs are parallel sided and these sides are in sliding engagement with the sides of the guideways when these are aligned therewith.

The first guideway 88 extends along a front portion of the path of movement of the marker head, and is constituted by the narrow front portion of a slot in a sliding plate 90, which plate slides within a longitudinal shallow recess in the inner side of the sideplate 52. A longitudinal slot 91 is also provided within this shallow recess in the sideplate 62, and the sliding plate 90 is held in the recess by a fiber washer 92 pressed against the outer surface of the plate 52 by spring washer 93, the spring washer being located in relation to the sliding plate 90 by a stud 94 which is slidable in the slot 91 (see FIG. 6). The slot 91 serves to limit longitudinal movement of the sliding plate 90, and the fiber washer provides frictional resistance to the movement of the sliding plate along the sideplate 52. The rear portion of the slot in sliding plate 90 is enlarged so that when the marker head is withdrawn along the rear portion of its path of movement the dog 85 can rotate to the vertically disposed position, but as the marker head is advanced with respect to the sliding plate (which is held by the friction of the washer 93 on the plate 52), the dog 85 strikes an inclined surface giving a tapered entry to the guideway 88, and so is caused to align itself with this guideway. This action is illustrated by the three positions shown in parts a, b and c of FIG. 9. It will be seen from this drawing that with the dog 85, aligned with the guideway 88 and extending rearwardly of the marker head, the stamp holder 75 is held in the marking position as also shown in FIGS. 1 and 2, in which the front face of the marker 78 is transverse to the direction of marking head movement and is in a suitable position for marking a workpiece.

The second guideway 89 extends along a rearward portion of the path of movement of the marker head, and is constituted by the narrow rear portion of a groove cut on the inside surface of the sideplate 52, and having a depth equal to that of the engaging dog 86. The rear end of this guideway 89 is contiguous with the slot 91. Conversely to the arrangement of guideway 88, the front portion of the groove in sideplate 52 is enlarged, so that in this case the dog 86 can lie vertically when in its front position, and there is also a tapered entry to the guideway 89 which is struck by dog 86 as the marker head is withdrawn, so that the face of the stamp becomes aligned with the guideway 89 as the marker head is retracted. This rotation of the stamp holder 75 ensures that while this is in its rearward position, and particularly when passing over the paint roller 60, the stamp is held in its wetting position, i.e. the position in which it can wipe over the roller.

It may be noted that even with the sliding face in its rearmost position, the two guideways 88 and 89 are separated at their inner ends by a space sufficient to allow for rotation of the stamp between its two positions when the marker head is in this intermediate position, and the manner of this rotation is indicated at FIG. 9(b).

In operation, the marking unit may be mounted at the inspection station either horizontally as shown, or vertically with the marking head downwards and with the top cover of the reservoir in the vertical plane. Providing that the reservoir is not overfilled, paint will not leak therefrom even in this vertical position. This is because as will be apparent from the drawings, with the marking unit in this vertical position the lower edge of the aperture 57 is above the lowermost part of the roller, so that while the marking unit is so disposed the reservoir can contain fluid up to a level sufficient to contact the bottom of the roller but insufficient to flow out of the reservoir from the aperture. The marking unit is normally maintained in the retracted position, and this is best ensured by applying slight air pressure to the forward end of the pneumatic cylinder 53. In this position the marker head 54 is in its rearmost position, and the engagement of dog 85 with the rear end of the sliding plate 90 maintains this sliding plate also in its most withdrawn position. Also, dog 86 has its sides engaged by, and is aligned with the guideway 89 in sideplate 52, and this ensures that the stamp is held downwardly in a position to wipe over the roller 60. On receipt of a signal from the sensing means, pressurized air is supplied to the rear end of pneumatic cylinder 53, causing the piston rod and marker head 54 to advance. As the head advances, the drive plate 70 engages the rubber belt 67, firstly pressing this against the pulley 65 and then against pulley 66, causing these pulleys to rotate and thus rotate the paint roller 60 to present a freshly wetted surface to the path of movement of the stamp. During this advance, the engagement of dog 86 in guideway 89 maintains the initial disposition of the rotatable holder 75 until the stamp has wiped over the roller 60 and has been wetted thereby.

As the marking head advances further, the dog 86 first leaves guideway 89, and then dog 85 strikes the tapered entrance to guideway 88, so causing the rotatable holder 75 to rotate until the dog 85 is aligned with the guideway 88, at which stage the stamp 78 extends forwardly in its stamping position, with the face thereof being transverse to the direction of movement. When the dog 85 has reached the end of guideway 88, the marking head causes the sliding plate 90 to advance therewith, until the marker strikes the workpiece.

When a marking operation is completed, the marker head is withdrawn by the application of pneumatic pressure to the forward end of cylinder 53. During this movement dog 85 remains aligned with the path of movement until dog 86 strikes the tapered entrance to guideway 89, which causes the dog 86 to rotate until axially aligned with this guideway, and so returns the stamp to its wetting position. Final movement of the marker head causes the dog 86 to strike the end of the groove in sliding plate 90, bringing this back to its initial retracted position.

The sliding plate 90 thus provides means which extend with the marker head and which maintain the orientation of the rotatable holder 75, and which is withdrawn subsequent to the withdrawal of marker head so as not to interfere with movement of workpieces along a production line.

It will be seen from this detailed description of the marker unit that this is particularly suitable for application to production line inspection stations, since it can readily be mounted in various dispositions, and since it operates with straight line movement and occupies very little space transverse to its line of operation. It will also be noted that the marking unit retracts fully, so that it can mark recessed areas on a workpiece and then withdraw without interfering with the movement of the workpieces.

The marking unit of this invention is, however, also useful for other marking operations, for example in coding operations, and also for spot lubrication. For coding operations in particular, the marking stamp may be modified to carry indices such as numbers.

I claim:

1. Apparatus for use for example as a marking unit comprising an extendible head attached to a plunger reciprocal along a straight path, the extendible head carrying a stamp rotatable from a first rotational position, in which position the stamp face is transverse to the direction of the plunger movement and suitably orientated so as to contact a workpiece when the plunger is extended, to a second rotational position in which the stamp face is substantially parallel to the direction of plunger movement, means for applying fluid to the stamp face comprising a fluid carrying surface so disposed beside the path of the head movement as to be wiped by the stamp face when in its second rotational position, and means for rotating said stamp in such manner as to ensure that the stamp face is in the first position when the plunger is fully extended, and is in the second position when the extendible head passes the fluid carrying surface, wherein the means for rotating the stamp comprise first and second mutually perpendicular dogs attached for rotation with the stamp and displaced axially from each other, the first dog extending rearwardly of the stamp and transversely of the stamp face and the second dog extending substantially parallel to the stamp face, a first guideway extending along a front portion of the path of movement of the extendible head and engaging the sides of the first dog so as to hold the stamp in its said first rotational position while the head is in the extended position, and a second guideway extending along a rearward portion of the path of movement of the head and beside the fluid carrying surface, said second guideway engaging the sides of the second dog to hold the stamp in its second rotational position as it passes the said surface, the adjacent ends of the two guideways being separated by a space allowing for the rotation of the stamp between the first and second positions caused by the entry of a dog into its respective guideway.

2. Apparatus according to claim 1, wherein the said dogs are disposed side by side, and engage in adjacent guideways.

3. Apparatus according to claim 2, wherein said first guideway is formed in a sliding plate which extends with the extendible head during a portion of the movement of the latter and retracts therewith.

4. Apparatus for use for example as a marking unit, comprising an extendible head attached to a plunger reciprocal along a straight path, the extendible head carrying a stamp rotatable from a first rotational position, in which position the stamp face is transverse to the direction of the plunger movement and suitably orientated so as to contact a workpiece when the plunger is extended, to a second rotational position in which the stamp face is substantially parallel to the direction of plunger movement, a roller rotatable in a fluid reservoir for applying fluid to the stamp face, said roller being so disposed beside the path of the head movement as to be wiped by the stamp face when in its second rotational position, means for rotating said stamp in such manner as to ensure that the stamp face is in the first position when the plunger is fully extended, and is in the second position when the extendible head passes the fluid carrying surface, said reservoir having a top cover provided with an aperture for said roller, said roller being arranged so that a minor proportion only projects from said aperture and almost fills the space provided by said aperture such that with the marking unit vertically disposed and with said top cover in a vertical plane the lower edge of said aperture is above the lowermost part of said roller, whereby while in this position the reservoir can contain fluid up to a level sufficient to contact the bottom of the roller but insufficient to flow from the aperture, said reservoir also containing an absorbing means which soaks up paint supplied thereto.

5. Apparatus for use for example as a marking unit, comprising an extendible head attached to a plunger reciprocal along a straight path, the extendible head carrying a stamp rotatable from a first rotational position, in which position the stamp face is transverse to the direction of the plunger movement and suitably orientated so as to contact a workpiece when the plunger is extended, to a second rotational position in which the stamp face is substantially parallel to the direction of plunger movement, a roller rotatable in a fluid reservoir for applying fluid to the stamp face, said roller being so disposed beside the path of the head movement as to be wiped by the stamp face when in its second rotational position, and means for rotating said stamp in such manner as to ensure that the stamp face is in the first position when the plunger is fully extended, and is in the second position when the extendible head passes the fluid carrying surface, and wherein there are provided means for rotating the roller on forward movement of the head, said means including a priming wheel mounted rearwardly of the roller with respect to the forwards movement of the extendible head, means transmitting rotary movement of the priming wheel to the roller, and means movable with the head causing rotation of the priming wheel and consequent rotation of the roller as the head moves forwardly.

6. Apparatus for claim 5, wherein said priming wheel is a pulley wheel, and wherein the roller is mounted for rotation on a spindle on which is also mounted a pulley wheel aligned with the priming pulley wheel, and wherein the means for rotating the roller includes a belt carried by the said two pulley wheels and constituting said means for transmitting rotary movement of the priming wheel to the roller and also including a drive plate engageable with said belt which drive plate is attached to the extendible head and which constitutes said means movable with the head to cause rotation of the priming wheel and the roller as the head moves forwardly.

References Cited
UNITED STATES PATENTS

| | | | |
|---|---|---|---|
| 1,212,360 | 1/1917 | Kenstowicz | 118—207 |
| 1,106,712 | 8/1914 | James | 101—44 |
| 1,517,207 | 11/1924 | Gallagher et al. | 101—44 |
| 2,677,325 | 5/1954 | Aller | 101—43 |
| 2,796,827 | 6/1957 | Vantlander | 101—44 |
| 3,022,726 | 2/1962 | Schuttenberg | 101—42 |
| 3,314,283 | 4/1967 | Fitzpatrick et al. | 73—40 |

JOHN P. McINTOSH, Primary Examiner

U.S. Cl. X.R.

118—8, 9; 101—44